United States Patent [19]

Holland et al.

[11] Patent Number: 4,550,286
[45] Date of Patent: Oct. 29, 1985

[54] ONBOARD METHOD OF DETECTING ELECTRICAL FAULTS IN A VEHICULAR AIR SUSPENSION SYSTEM

[75] Inventors: Scott B. Holland, Sterling Heights; Bruce D. Strachan, Canton, both of Mich.

[73] Assignee: Ford Motor Company, Dearborn, Mich.

[21] Appl. No.: 570,102

[22] Filed: Jan. 12, 1984

[51] Int. Cl.⁴ .............................................. G01R 31/02
[52] U.S. Cl. ..................................... 324/51; 280/707; 340/52 R
[58] Field of Search .................. 324/51; 340/666, 665, 340/626, 611, 60, 635, 650, 653, 514, 52 R; 307/9, 10 R; 280/DIG. 1, 707, 6 H; 364/550, 551

[56] References Cited

U.S. PATENT DOCUMENTS

| | | | |
|---|---|---|---|
| 3,558,156 | 1/1971 | Jackson et al. | 280/124 |
| 4,042,135 | 8/1977 | Pugh et al. | 214/141 |
| 4,105,216 | 8/1978 | Graham et al. | 280/6 R |
| 4,168,840 | 9/1979 | Graham | 280/6 R |
| 4,172,980 | 10/1979 | Hsieh et al. | 307/9 |
| 4,185,845 | 1/1980 | Misch et al. | 280/6 H |

Primary Examiner—Stanley T. Krawczewicz
Assistant Examiner—Jack B. Harvey
Attorney, Agent, or Firm—Paul K. Godwin, Jr.; Robert D. Sanborn

[57] ABSTRACT

A method of detecting electrical faults that may occur in a vehicular air suspension system utilizing height sensors and air springs mounted between sprung and unsprung components of the vehicle. The method involves defining specific signals that are available from a properly functioning and an improperly functioning height sensor during both its energized and de-energized conditions and comparing the output signals with the defined signals to determine fault occurrences and communicating that event to the vehicle operator when the number of detected fault occurrences exceed a predetermined number.

4 Claims, 3 Drawing Figures

ONBOARD METHOD OF DETECTING ELECTRICAL FAULTS IN A VEHICULAR AIR SUSPENSION SYSTEM

BACKGROUND OF THE INVENTION

1. Field of the Invention

The present invention is directed to the field of air suspension control systems and more specifically to the area of validating sensor readings and providing a detectable warning when the sensor readings are invalid.

2. Description of the Prior Art

It is known in the prior art to provide vehicular suspension systems in which at least the rear portion of the vehicle is maintained at a particular trim level by providing compressed air to either an air spring or an expandable shock absorber. Supplying air or bleeding off air is the common method of adjusting the suspension system in order to maintain the trim level. In many of the prior art systems, height sensors are incorporated which are mounted between sprung and unsprung components of the vehicle to sense changes in the distance between the sprung and unsprung components to thereby indicate whether the vehicle is in or out of its trim position.

SUMMARY OF THE INVENTION

The present invention is intended to provide the detection of fault that may occur, from time to time, in the electrical wiring that connects an electrically energized suspension height sensor to control circuitry for its air suspension system.

In that system, as presently embodied, three height sensors are mounted between sprung and unsprung components, at each of the respective front wheels and at the rear center of the vehicle. The height sensors are linear transducers that convert mechanical movement between the sprung and unsprung components into digital electrical signals that reflect one of three measurable ranges of distance between the sprung and unsprung components. Those ranges are correlated as the vehicle being "too high", "correct height" or "too low". In automotive parlance those vehicle height conditions are "REBOUND", "TRIM" or "JOUNCE", respectively.

The digital signals from each sensor are input to a microprocessor control unit which, through appropriate programming, assesses the validity of the signals derived from each height sensor by using the method of the present invention. Once the signals are determined to be valid from any sensor, the control program of the control unit commands the air suspension system to either vent air from appropriate air spring(s); do nothing; or pump air into the appropriate air spring(s). The readings of the height sensors are made approximately 30 times each second and appropriate corrections to the air springs are made in order to maintain the vehicle at a TRIM condition.

Each height sensor, as disclosed herein, utilizes a pair of "Hall effect" cells that are activated by the presence of a strong magnetic field. The sensor body is connected to the sprung component of the vehicle and contains the two Hall cells. A movable sensor rod is attached to the unsprung component of the vehicle and contains two oppositely polarized magnets. The position of the magnets, with respect to the Hall cells, determines the digital signal that is detected by the microprocessor control unit. In this case, the Hall cells, when electrically energized, appropriately bias corresponding output transistors in conducting or nonconducting states. Individual sensing wires are connected between the transistors and a junction of a load dropping resistor and a sensor input terminal of the microprocessor control unit. A load dropping resistor is connected between a regulated DC supply and a junction in order to provide a binary bit of information ("1" or "0") to an input terminal of the microprocessor control unit for each associated Hall cell. Each height sensor therefor outputs a set of two binary bits according to the position of the sensor rod.

The method of the present invention comprises the steps of: defining an invalid set of two binary bits from each sensor, as distinguished from the three defined valid sets of binary bits; electrically energizing each height sensor; reading the sets of binary bits provided to the microprocessor control unit by each height sensor; comparing each read set of binary bits with the defined invalid set; generating a fault signal whenever the comparison indicates equality; recording each occurrence of the fault signal; repeating the foregoing steps until the number of occurrences of the fault signal for any one height sensor exceeds a predetermined number; and providing a human detectable fault indication when the number of fault signal occurrences exceed that predetermined number.

It was found that, when electrical energy power is not applied to the height sensors, the only valid indication from those sensors is equal to the invalid set of two binary bits defined for the energized condition. In order to use that discovery, the method further includes, after the aforementioned step of comparing, the steps of: disconnecting electrical energy from the height sensors; reading the two bits of information from each sensor; comparing the two bits of information from each sensor with the defined invalid indication and outputting an invalid signal whenever the two bits of information does not match the defined invalid indication.

The present method allows the system to provide operator indication when a fault occurs, such as a disconnected height sensor, or shorted or open sensor lines or power lines. In the event that a particular height sensor is detected as providing false or invalid digital information, such indication allows the microprocessor control unit to ignore the invalid signals and only provide service in response to valid signals from other height sensors.

DESCRIPTION OF THE PREFERRED EMBODIMENT

Figure 1:
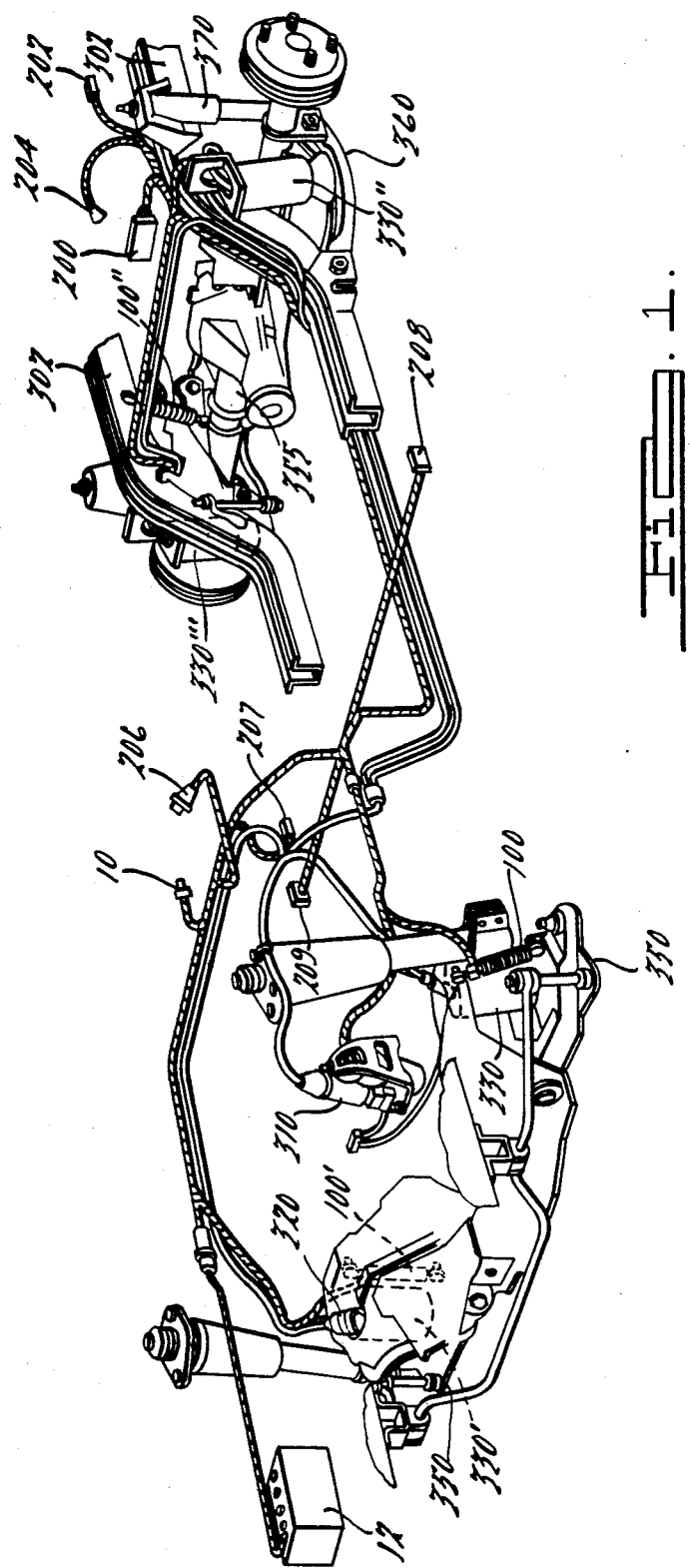
FIG. 1 is an overall view of a vehicle installed air suspension system incorporating the present invention.

The system, as shown in FIG. 1, includes air springs 330, 330', 330" and 330'" between sprung components, such as the vehicle frame 302 or the body (not shown), and unsprung components, such as the lower control arm 360 in the rear and the lower arm 350 for each steering wheel in the front of the vehicle. Each air spring includes an electrically controlled solenoid air valve 320 which, when energized, allows air to flow into or out of the air spring. Air flow to and from the air spring is through a closed pressure system that terminates at an electrically controlled air compressor 310. Three suspension height sensors 100, 100' and 100" are utilized in the described system to sense height changes between sprung and unsprung components at each of the front corners and at the rear of the vehicle.

An electronic control module 200 contains an (8049) microprocessor computer 210 and individual power drivers to maintain the vehicle at a predetermined trim condition by commanding operation of the compressor 310 and solenoid valves 320 and to energize the height sensors.

Figure 2:
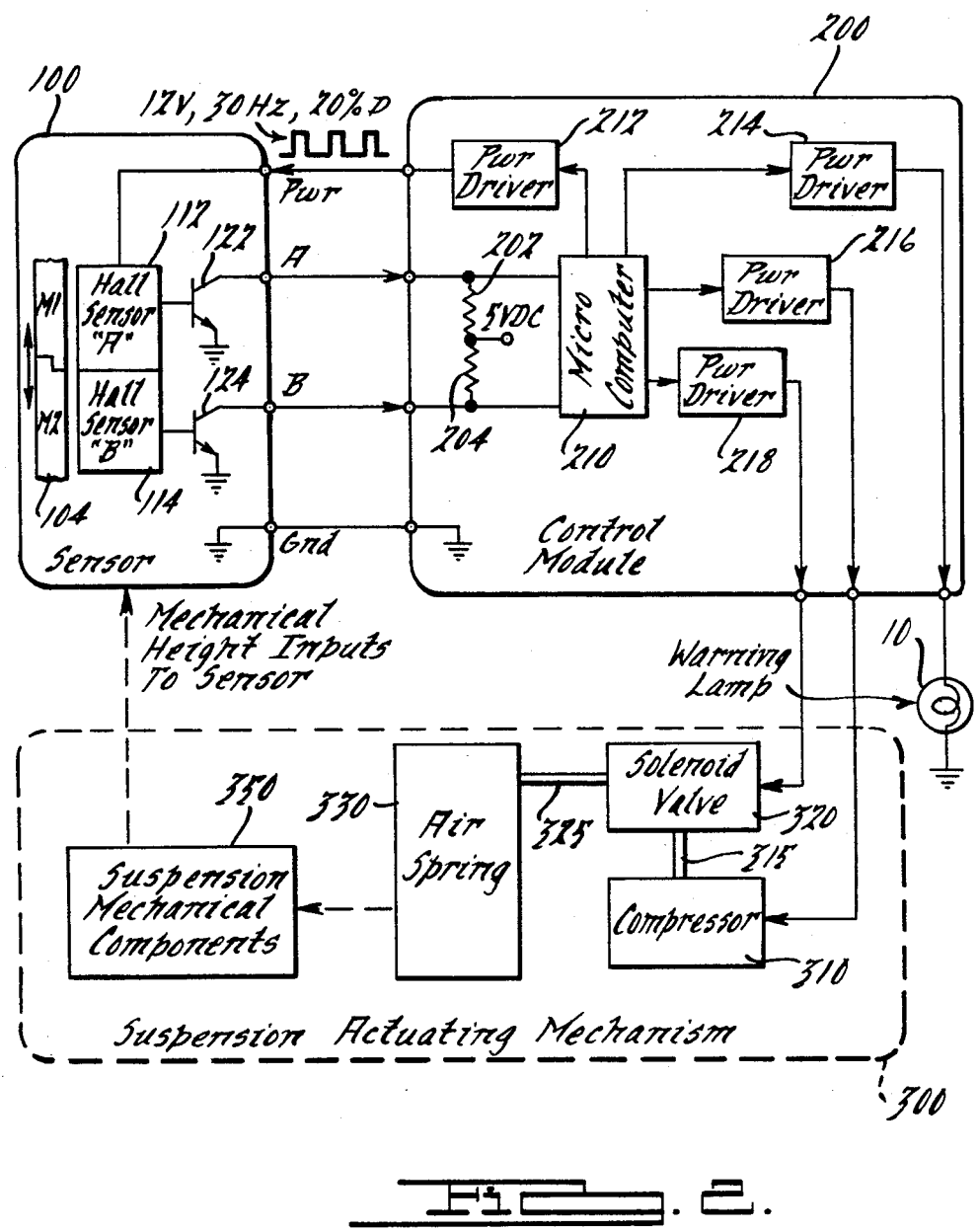
FIG. 2 is a block diagram illustrating the central components of an air suspension height control system, with respect to a single height sensor and air spring.

In FIG. 2, a block diagram of the air suspension height control system is illustrated in which a single height sensor 100 is electrically connected via a wiring harness to the control module 200. The control module 200 is electrically connected to control the air suspension actuating mechanism 300 and a warning lamp 10 that is conveniently mounted in the vehicle passenger compartment for operator attention, in the event of a component failure. The height sensor 100 is mounted between sprung and unsprung components of the vehicle such as indicated in FIG. 1. The housing, which includes Hall sensors 112 and 114 as well as corresponding output transistors 122 and 124 mounted within the housing in a nonmoveable relationship with respect thereto, is attached to the sprung component of the vehicle, such as the body. A moveable sensor rod 104 comprises a pair of oppositely polarized magnets M1 and M2 longitudinally disposed adjacent the Hall sensors 112 and 114 to provide the magnetic actuating field for the sensors. The sensor rod 104 is mechanically connected for longitudinal movement to the unsprung suspension components, which may be a rear axle housing 355" or the lower arm 350, as shown in FIG. 1. In any event, the sensor rod 104 is caused to be repositioned longitudinally as the distance between the sprung and unsprung components changes due to load pressures on the vehicle.

The Hall sensors 112 and 114, when energized, provide biasing to output transistors 122 and 124 respectively. The output of each Hall sensor reflects the longitudinal position of the sensor rod 104 as communicated by the magnetic field intensity, at each Hall sensor, contributed by the adjacent magnets M1 and M2.

The collectors of each of the output transistors 122 and 124 are connected via sensor lines A and B to sensor input terminals of a microprocessor computer 210 in the control module 200. Load dropping resistors 202 and 204 are connected from a 5-volt regulated DC source to junctions between respective sensor lines A and B and separate sensor input terminals of the microprocessor computer 210. The load dropping resistors 202 and 204 combine with respective sensor output transistors 122 and 124 to provide a binary single bit of information at each of the sensor input terminals of the microprocessor computer 210 in the form of a "1" at a 5-volt DC level or an "0" at an approximate zero voltage level.

TABLE

| HEIGHT CONDITION | ENERGIZED SENSOR LOGIC | | | DEENERGIZED SENSOR LOGIC | |
|---|---|---|---|---|---|
| | A | B | | A | B |
| REBOUND (HIGH) | 1 | 0 | (valid) | 1 | 1 |
| TRIM (OK) | 0 | 0 | (valid) | 1 | 1 |
| JOUNCE | 0 | 1 | (valid) | 1 | 1 |
| (LOW) | 1 | 1 | (invalid) | 1 | 0 |
| | | | (invalid) | 0 | 0 |
| | | | (invalid) | 0 | 1 |

The TABLE illustrates three valid sets of binary data bits that may be provided by each height sensor 100 according to three corresponding ranges of measurement. When the vehicle is in the REBOUND condition, due for instance to the vehicle having a lightened load, the sensor rod 104 is moved downward with respect to the Hall sensors 112 and 114. In that position, the opposing magnets M1 and M2 also are at a lower position so as to cause the Hall sensor 112 to bias the output transistor 122 in a nonconductive state and thereby provide a "1" data bit to the "A" sensor input terminal of the microprocessor computer 210. At that same position, the Hall sensor 114 is caused to bias the output transistor 124 in a conducting state so that a "0" data bit is provided to the "B" sensor input terminal of the microprocessor computer 210. Similarly, when the vehicle is at TRIM, the sensor rod 104 is positioned in such a manner that Hall sensors 112 and 114 respectively cause output transistors 122 and 124 to be in their conducting states to provide "0" data bits at both "A" and "B" sensor input terminals of the microprocessor computer 210. When the vehicle is in its JOUNCE condition, due for instance to high load forces, the sensor rod 104 is moved in an upward direction to cause the Hall sensors 112 and 114 to respectively bias output transistors 122 and 124 in conducting and nonconducting states and thereby respectively provide "0" and "1" data bits to the "A" and "B" sensor input terminals of the microprocessor computer 210.

In the event the wiring harness between the height sensor 100 and the control module 200, that includes the power and sensor lines, becomes disconnected, or otherwise opened, the high "1" volt levels will be present on each of the sensor inputs of the microprocessor computer 210. A set of data "1", "1" data bits is defined as an invalid set since it does not reflect any valid measurement from the height sensor during its electrically energized condition. However, during the de-energized condition of the height sensor, the output transistors 122 and 124 are biased in their nonconducting states. Therefore, the only valid set of data bits for any position of the height sensor in its de-energized condition will be "1", "1". This corresponds to the invalid set of data bits that may occur when the height sensor is energized. In fact, if the wiring harness between the height sensor and the control module develops a short or other grounding problem, invalid sets of data bits may appear at the input terminals of the microprocessor computer 210 during the de-energized state of the height sensor. Those invalid sets of data bits also appear in the TABLE.

Figure 3:
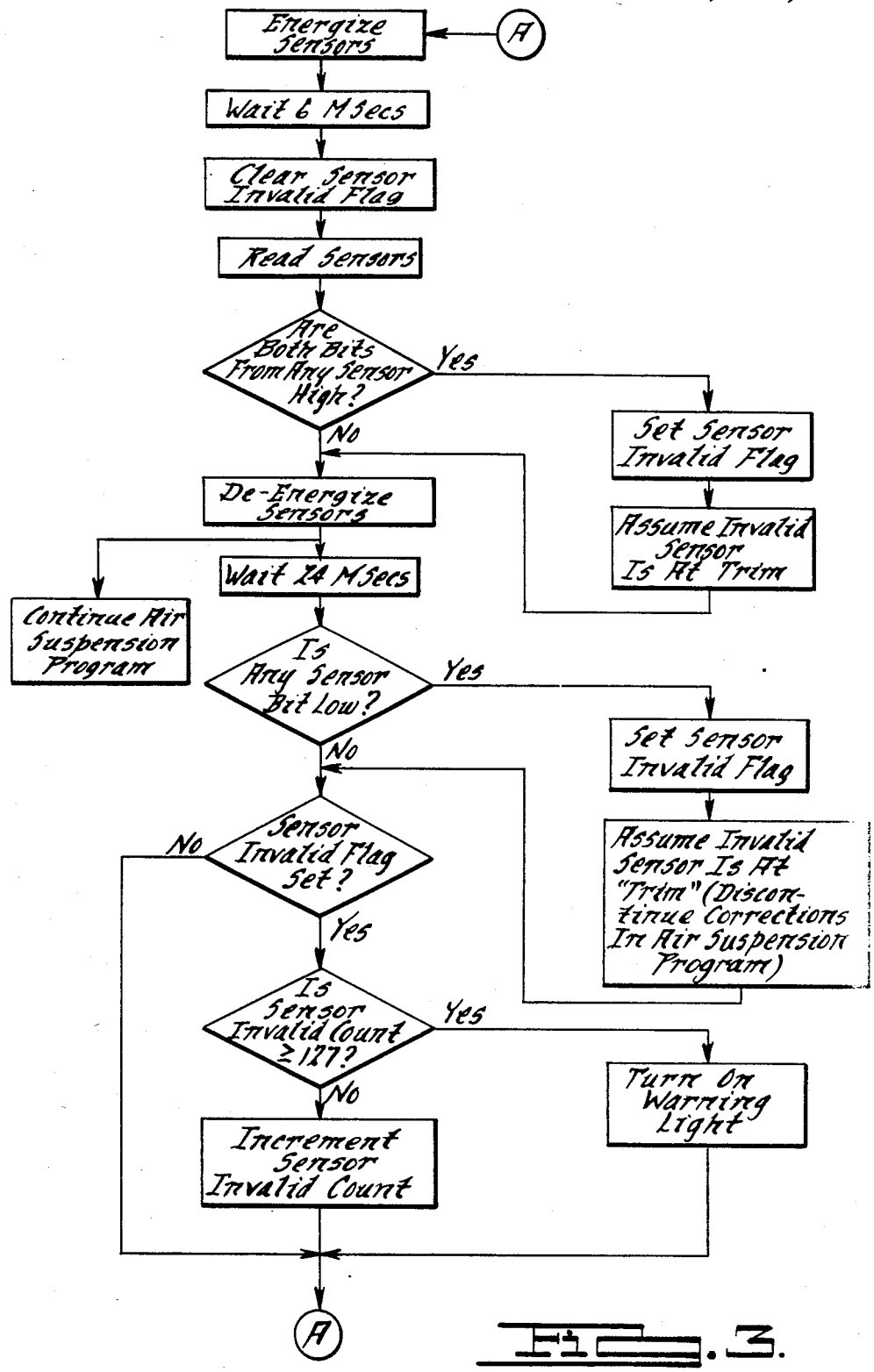
FIG. 3 is a flow diagram illustrating the various steps employed to carry out the present invention.

Referring to the flow diagram shown in FIG. 3, the microprocessor computer 210 is programmed to energize all of the height sensors by use of a 12-volt, 30 Hz pulse cycle having a 20% duty cycle. This means that a 12 volt pulse is applied to the height sensors for a period of approximately 6.7 ms for each 33 ms cycle and the sensors are de-energized for approximately 26.3 ms out of each cycle. Following energization of the sensors, the microprocessor computer 210 waits approximately 6 ms and then clears a "sensor invalid" flat in an appropriate interior register. The data bits available at the sensor inputs of the microprocessor computer 210 are then read for each height sensor connected thereto. Since the system has defined the invalid data set as being "1", "1" during the time the sensors are energized, each set of sensor data bits is compared with the defined invalid set to determine equality. If any sensor provides a set of data bits where both bits are high (1,1) then the sensor invalid flag is set in an internal register of the microprocessor computer 210 and the air suspension control program for that particular height sensor is inhibited by assuming that the invalid sensor is at a TRIM position. The height sensors are then de-energized and the air suspension control program continues during this de-energized portion of the cycle. After a period of approximately 24 ms, the bit levels present at the sensor inputs of the microprocessor computer 210 are read to determine if any of the bits from the sensors are at a low (0) level. If any bit is low, the sensor invalid flag is set and that particular sensor is subsequently ignored by the air suspension control program as being at a TRIM level. If a sensor invalid flag is set, that occurrence is incremented in an internal invalid sensor count register within the microprocessor computer 210. The foregoing steps are repeated for each cycle of energization and de-energization. When the invalid sensor count register has been incremented to a value that is greater than, in this case, 126 the microprocessor computer 210 provides an output signal to a power driver 214 which energizes a warning lamp 10 in view of the operator of the vehicle. Such a warning thereby notifies the operator that one of the height sensors is not providing proper signals to the air suspension controller and therefore requires service to correct the fault.

It will be readily apparent that many modifications and variations may be implemented without departing from the scope of the novel concept of this invention. Therefore, it is intended by the appended claims to cover all such modifications and variations which fall within the true spirit and scope of the invention.

We claim:

1. A method for detecting electrical faults in a vehicular air suspension system incorporating at least one height sensor mounted between sprung and unsprung components of the vehicle, containing electrical circuitry for indicating, with two bits of output information, one range of three defined ranges of separation between said sprung and unsprung components, comprising the steps of:

defining an invalid indication by said two bits of information from said height sensor;

electrically energizing said electrical circuit of said at least one height sensor;

reading the range of separation indicated by said two bits of output information;

comparing said two bits of output information with said defined invalid indication and outputting a fault signal whenever said comparison indicates equality; and recording each occurrence of said fault signal;

repeating the above steps until the number of occurrences of fault signals exceeds a predetermined number; and providing a human detectable fault indication when the number of fault signal occurrences exceed said predetermined number.

2. A method of detecting electrical faults as in claim 1, wherein said invalid indication is also defined as the only valid indication from said height sensor when said electrical circuitry of said at least one height sensor is not electrically energized and further including, after the step of comparing, the steps of:

electrically deenergizing said electrical circuitry of said at least one height sensor;

reading the two bits of output information from said sensor;

comparing said two bits of output information with said defined only valid indication and outputting a fault signal whenever sid two bits of output information does not match said defined only valid indication.

3. A method of detecting faults in electrical sensor signal lines and electrical power lines connected to at least one height sensor, mounted between and measuring the distance between sprung and unsprung components of a vehicle, comprising the steps of:

providing a predetermined first level of electrical energy to said height sensor for a predetermined period of time followed by a periodic interval at a substantially zero level of electrical energy;

providing said height sensor with a logic network that outputs one of three possible valid two binary bit combinations, in response to three defined ranges of measured distance between said sprung and unsprung components during said predetermined period of time in which said first level of electrical energy is provided to said height sensor, and one other valid bit combination during said periodic interval;

defining a fourth two binary bit combination as an invalid combination that indicates a fault in said electrical sensor signal lines or said power lines during said period of time during which said first level of electrical energy is provided;

comparing said logic network output bit combination with said fourth defined bit combination and responsively supplying an indication when said comparison indicates equality;

counting each occurrence of said equality indication; and providing a human detectable fault warning in said vehicle when said number of counted occurrences exceeds a predetermined value.

4. Method as in claim 3, wherein said provided logic network outputs one valid two binary bit combination during said periodic interval and said method includes the steps of defining invalid bit combinations that indicate a short-to-ground fault in said sensor or said electrical sensor lines during said periodic interval;

comparing said logic network output bit combination with said defined invalid bit combinations and responsively supplying an indication when said comparison indicates an equality, prior to said step of counting.

* * * * *